(12) United States Patent
Hosseini et al.

(10) Patent No.: US 11,877,302 B2
(45) Date of Patent: Jan. 16, 2024

(54) CONTROL CHANNEL ELEMENT AND BLIND DECODE LIMITS FOR PHYSICAL DOWNLINK CONTROL CHANNEL

(71) Applicant: QUALCOMM Incorporated, San Diego, CA (US)

(72) Inventors: Seyedkianoush Hosseini, San Diego, CA (US); Huilin Xu, San Diego, CA (US); Wei Yang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/248,042

(22) Filed: Jan. 6, 2021

(65) Prior Publication Data

US 2021/0212075 A1  Jul. 8, 2021

Related U.S. Application Data

(60) Provisional application No. 62/958,243, filed on Jan. 7, 2020.

(51) Int. Cl.
*H04W 72/53* (2023.01)
*H04W 24/08* (2009.01)
(Continued)

(52) U.S. Cl.
CPC .......... *H04W 72/53* (2023.01); *H04L 1/0038* (2013.01); *H04L 27/26025* (2021.01);
(Continued)

(58) Field of Classification Search
CPC . H04W 24/08; H04W 72/0453; H04W 72/23; H04W 72/53; H04W 8/24;
(Continued)

(56) References Cited

U.S. PATENT DOCUMENTS

| 9,622,233 B1* | 4/2017 | Mansour | H04L 5/0053 |
| 2013/0109372 A1* | 5/2013 | Ekici | H04W 24/10 |
| | | | 455/422.1 |

(Continued)

FOREIGN PATENT DOCUMENTS

| CN | 101998526 A | 3/2011 |
| CN | 103813464 A | 5/2014 |

(Continued)

OTHER PUBLICATIONS

International Search Report and Written Opinion—PCT/US2021/070010—ISA/EPO—dated May 12, 2021.

*Primary Examiner* — Dung B Huynh
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information for a plurality of carriers, wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes satisfies a per-span capability of the UE, wherein the distribution is among a plurality of sets of carriers, and wherein each set of carriers of the plurality of sets of carriers is associated with a respective subcarrier spacing and a respective span configuration. The UE may receive communications on the plurality of carriers in accordance with the distribution. Numerous other aspects are described.

47 Claims, 7 Drawing Sheets

(51) Int. Cl.
*H04L 27/26* (2006.01)
*H04W 72/0453* (2023.01)
*H04L 1/00* (2006.01)
*H04W 8/24* (2009.01)
*H04W 72/23* (2023.01)

(52) U.S. Cl.
CPC .......... *H04L 27/2676* (2013.01); *H04W 8/24* (2013.01); *H04W 24/08* (2013.01); *H04W 72/0453* (2013.01); *H04W 72/23* (2023.01)

(58) Field of Classification Search
CPC .............. H04L 1/0038; H04L 27/2602; H04L 27/26025; H04L 27/2676; H04L 5/001
See application file for complete search history.

(56) References Cited

U.S. PATENT DOCUMENTS

| | | | |
|---|---|---|---|
| 2013/0182664 A1* | 7/2013 | Chen | H04L 1/0046 370/329 |
| 2017/0006609 A1* | 1/2017 | Adachi | H04W 72/0453 |
| 2017/0134977 A1* | 5/2017 | Nader | H04W 72/0453 |
| 2018/0183551 A1* | 6/2018 | Chou | H04L 5/0042 |
| 2018/0184410 A1* | 6/2018 | John Wilson | H04L 5/0053 |
| 2018/0192405 A1* | 7/2018 | Gong | H04L 1/0045 |
| 2018/0220305 A1* | 8/2018 | Lei | H04W 72/23 |
| 2018/0227156 A1* | 8/2018 | Papasakellariou | H04W 72/0453 |
| 2019/0028221 A1* | 1/2019 | Ratasuk | H04W 24/08 |
| 2019/0357185 A1* | 11/2019 | Kwak | H04L 5/0094 |
| 2020/0100219 A1* | 3/2020 | Takeda | H04W 72/23 |
| 2020/0213985 A1* | 7/2020 | Baldemair | H04L 5/0053 |
| 2020/0314678 A1* | 10/2020 | Lee | H04W 72/12 |
| 2020/0322929 A1* | 10/2020 | Bagheri | H04W 72/23 |
| 2020/0329389 A1* | 10/2020 | Hosseini | H04W 24/08 |
| 2020/0367080 A1* | 11/2020 | Salah | H04W 52/0261 |
| 2020/0396725 A1* | 12/2020 | Ji | H04L 5/0094 |
| 2020/0413443 A1* | 12/2020 | Xing | H04W 72/0453 |
| 2021/0029726 A1* | 1/2021 | Papasakellariou | H04W 72/21 |
| 2021/0058906 A1* | 2/2021 | Seo | H04W 16/28 |
| 2021/0058970 A1* | 2/2021 | Kwak | H04L 5/0064 |
| 2021/0067268 A1* | 3/2021 | Seo | H04L 25/0238 |
| 2021/0105804 A1* | 4/2021 | Bagheri | H04L 5/0053 |
| 2021/0153177 A1* | 5/2021 | Hosseini | H04L 1/0045 |
| 2021/0160002 A1* | 5/2021 | Salah | H04L 1/0039 |
| 2021/0168782 A1* | 6/2021 | Hamidi-Sepehr | H04B 17/18 |
| 2021/0320821 A1* | 10/2021 | Lee | H04W 56/00 |
| 2021/0321366 A1* | 10/2021 | Hosseini | H04L 27/2602 |
| 2021/0360593 A1* | 11/2021 | Hosseini | H04L 5/0053 |
| 2022/0132341 A1* | 4/2022 | Lee | H04L 5/0007 |
| 2022/0182860 A1* | 6/2022 | Chatterjee | H04L 5/0007 |
| 2022/0201515 A1* | 6/2022 | Chatterjee | H04L 1/0038 |
| 2022/0225329 A1* | 7/2022 | Xu | H04W 72/23 |
| 2022/0225393 A1* | 7/2022 | Gao | H04W 72/23 |
| 2022/0312391 A1* | 9/2022 | He | H04W 72/23 |
| 2022/0329399 A1* | 10/2022 | Kittichokechai | H04L 5/0053 |
| 2022/0330249 A1* | 10/2022 | Chen | H04W 72/0453 |
| 2022/0338039 A1* | 10/2022 | Takahashi | H04W 72/0453 |
| 2023/0007657 A1* | 1/2023 | Liu | H04L 5/0007 |
| 2023/0033872 A1* | 2/2023 | Oteri | H04W 48/12 |
| 2023/0100953 A1* | 3/2023 | Marzban | H04W 72/23 370/335 |

FOREIGN PATENT DOCUMENTS

| | | |
|---|---|---|
| CN | 105991218 A | 10/2016 |
| EP | 2523515 A1 | 11/2012 |
| EP | 2587857 A2 | 5/2013 |
| EP | 2810472 A1 | 12/2014 |
| EP | 3202165 A1 | 8/2017 |
| EP | 3322240 A1 | 5/2018 |
| EP | 3554167 A1 | 10/2019 |
| WO | 2019221660 A1 | 11/2019 |

* cited by examiner

CONTROL CHANNEL ELEMENT AND BLIND DECODE LIMITS FOR PHYSICAL DOWNLINK CONTROL CHANNEL

CROSS-REFERENCE TO RELATED APPLICATION

This Patent application claims priority to U.S. Provisional Patent Application No. 62/958,243, filed on Jan. 7, 2020, entitled "CONTROL CHANNEL ELEMENT AND BLIND DECODE LIMITS FOR PHYSICAL DOWNLINK CONTROL CHANNEL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for control channel element (CCE) and blind decode (BD) limits for a physical downlink control channel (PDCCH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configuration information for a plurality of carriers, wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes that satisfies a per-span capability of the UE, wherein the distribution is among a plurality of sets of carriers, and wherein each set of carriers of the plurality of set of carriers is associated with a respective subcarrier spacing and a respective span configuration; and receiving communications on the plurality of carriers in accordance with the distribution.

In some aspects, a method of wireless communication, performed by a base station, may include transmitting configuration information for a plurality of carriers, wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes that satisfies a per-span capability of the UE, wherein the distribution is among a plurality of sets of carriers, and wherein each set of carriers of the plurality of set of carriers is associated with a respective subcarrier spacing and a respective span configuration; and transmitting communications on the plurality of carriers in accordance with the distribution.

In some aspects, a UE for wireless communication may include memory and one or more processors operatively coupled to the memory. The memory and the one or more processors may be configured to receive configuration information for a plurality of carriers, wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes that satisfies a per-span capability of the UE, wherein the distribution is among a plurality of sets of carriers, and wherein each set of carriers of the plurality of set of carriers is associated with a respective subcarrier spacing and a respective span configuration; and receive communications on the plurality of carriers in accordance with the distribution.

In some aspects, a non-transitory computer-readable medium may store one or more instructions for wireless communication. The one or more instructions, when executed by one or more processors of a UE, may cause the one or more processors to: receive configuration information for a plurality of carriers, wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes that satisfies a per-span capability of the UE, wherein the distribution is among a plurality of sets of carriers, and wherein each set of carriers of the plurality of set of carriers is associated with a respective subcarrier spacing and a respective span configuration; and receive communications on the plurality of carriers in accordance with the distribution.

In some aspects, an apparatus for wireless communication may include means for receiving configuration information for a plurality of carriers, wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes that satisfies a per-span capability of the UE, wherein the distribution is among a plurality of sets of carriers, and wherein each set of carriers of the plurality of set of carriers is associated with a respective subcarrier spacing and a respective span configuration; and means for receiving communications on the plurality of carriers in accordance with the distribution.

In some aspects, a non-transitory computer-readable medium may store one or more instructions for wireless communication. The one or more instructions, when executed by one or more processors of a base station, may cause the one or more processors to: transmit configuration information for a plurality of carriers, wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes that satisfies a per-span capability of the UE, wherein the distribution is among a plurality of sets of carriers, and wherein each set of carriers of the plurality of set of carriers is associated with a respective subcarrier spacing and a respective span configuration; and transmit communications on the plurality of carriers in accordance with the distribution.

In some aspects, a base station for wireless communication may include memory and one or more processors operatively coupled to the memory. The memory and the one or more processors may be configured to transmit configuration information for a plurality of carriers; wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes that satisfies a per-span capability of the UE, wherein the distribution is among a plurality of sets of carriers, and wherein each set of carriers of the plurality of set of carriers is associated with a respective subcarrier spacing and a respective span configuration; and transmit communications on the plurality of carriers in accordance with the distribution.

In some aspects, an apparatus for wireless communication may include means for transmitting configuration information for a plurality of carriers, wherein a number of carriers, of the plurality of carriers, exceeds a threshold associated with a monitoring capability of the UE, wherein the monitoring capability is for span-based monitoring of the plural-ity of carriers, wherein a distribution of at least one of a plurality of non-overlapped control channel elements (CCEs) or a plurality of blind decodes that satisfies a per-span capability of the UE, wherein the distribution is among a plurality of sets of carriers, and wherein each set of carriers of the plurality of set of carriers is associated with a respective subcarrier spacing and a respective span configuration; and means for transmitting communications on the plurality of carriers in accordance with the distribution.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
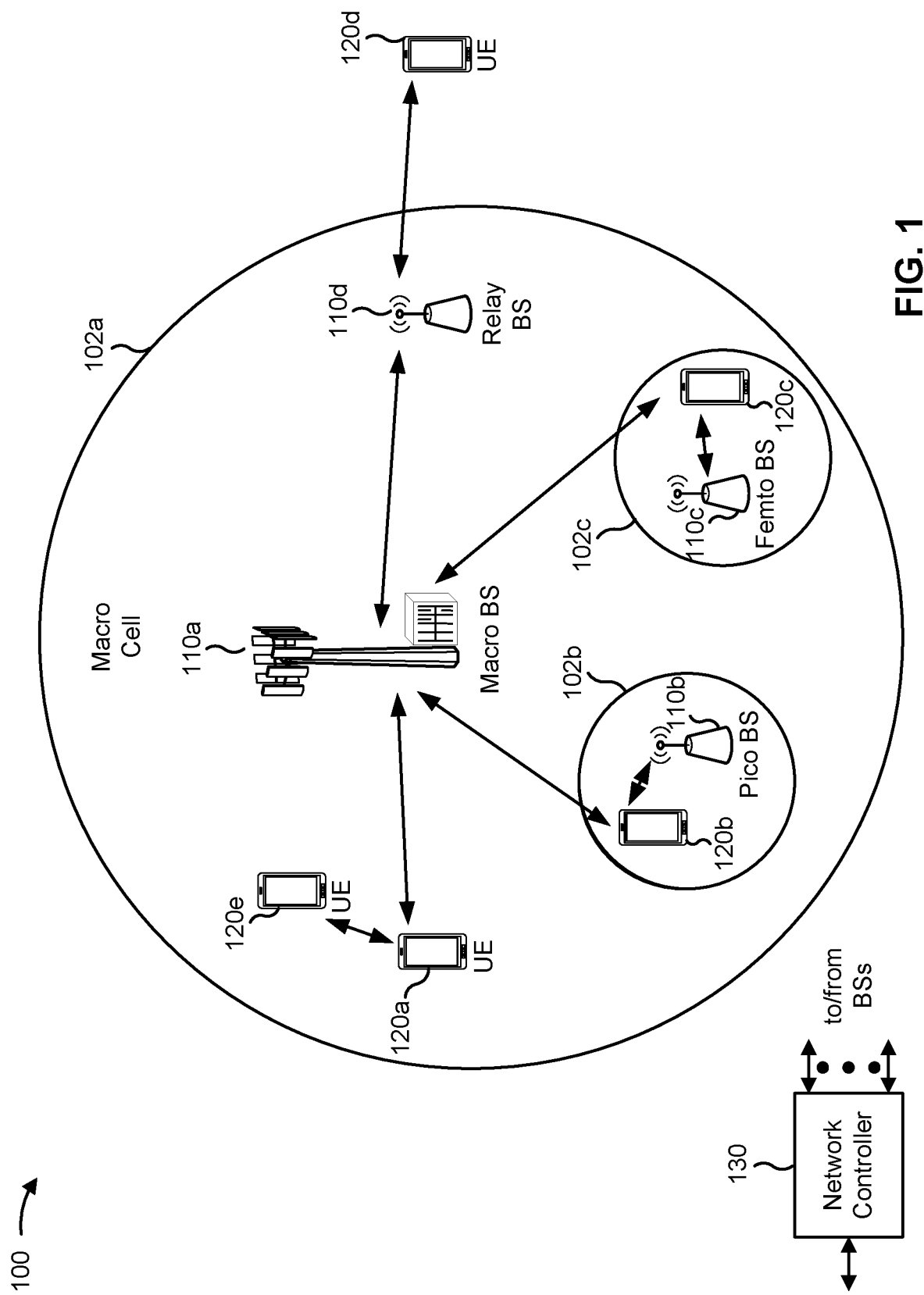
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
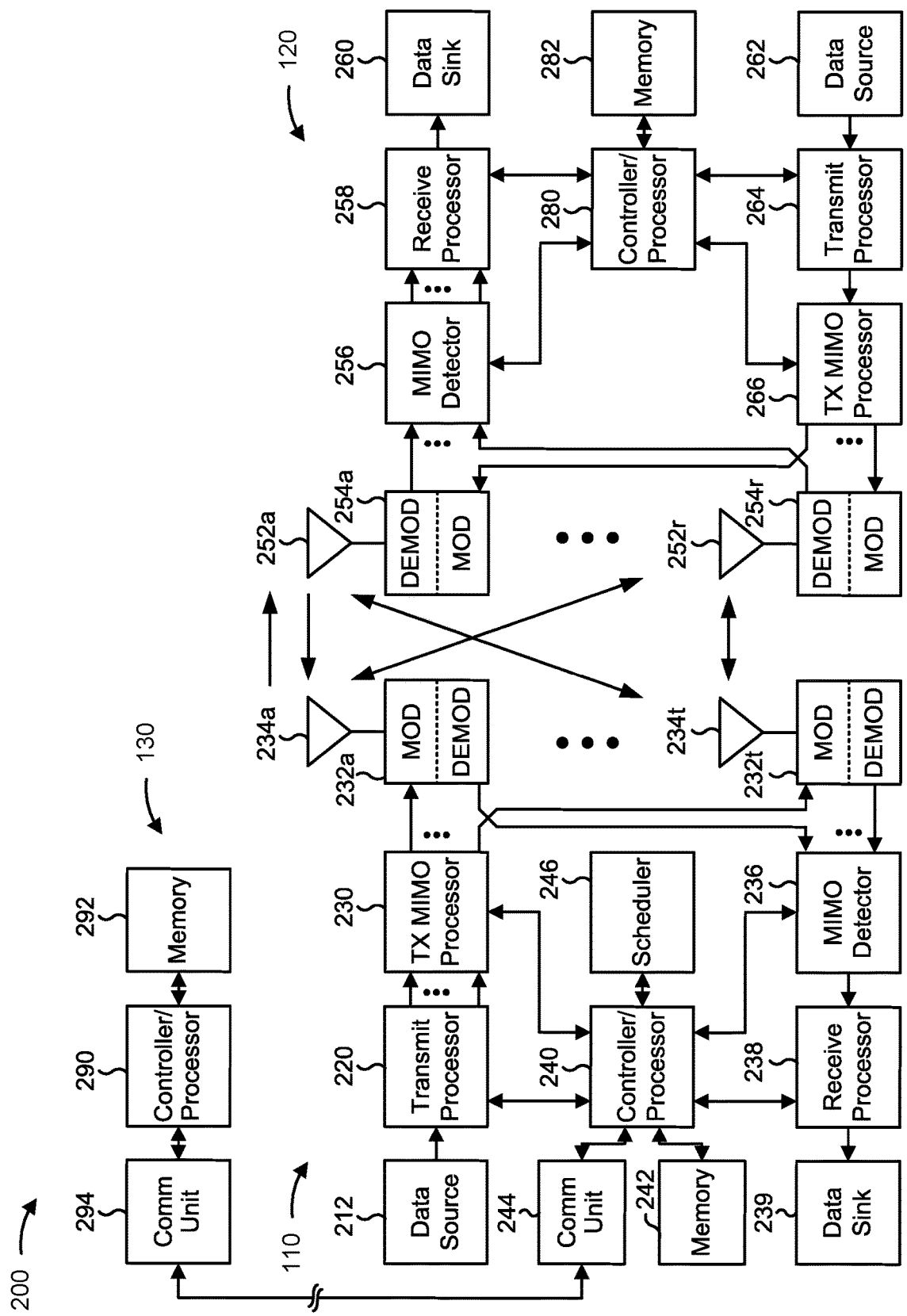
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with control channel element (CCE) and blind decode (BD) limits for a physical downlink control channel (PDCCH), as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for receiving configuration information for a plurality of carriers; means for determining, for the plurality of carriers, a distribution of at least one of a plurality of non-overlapped CCEs or a plurality of blind decodes that satisfies a per-span capability of the UE; means for receiving communications on the plurality of carriers in accordance with the distribution; means for determining an effective number of carriers for a given subcarrier spacing based at least in part on a total number of carriers of the plurality of carriers, a number of carriers of the given subcarrier spacing, and the threshold associated with the monitoring capability, wherein the threshold identifies a total number of carriers for which the UE supports per-span blind detection or CCE limitation; means for determining the distribution, with regard to a first carrier and a second carrier associated with the given subcarrier spacing, based at least in part on respective per-span capabilities of the first carrier and the second carrier and on the effective number of carriers; means for selecting respective slots of the plurality of carriers; means for determining, for a set of carriers, of the plurality of carriers, a set of values based at least in part on dividing respective maximum numbers of blind decodes or respective maximum numbers of non-overlapped CCEs across respective sets of spans of the respective slots of the set of carriers by respective maximum numbers of blind decodes or non-overlapped CCEs indicated by respective per-span capabilities for the respective sets of spans; means for determining the distribution so that a sum of the set of values does not exceed a total number of carriers for which the UE supports per-span blind detection or CCE limitation; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for transmitting configuration information for a plurality of carriers; means for determining, for the plurality of carriers, a distribution of at least one of a plurality of non-overlapped CCEs or a plurality of blind decodes that satisfies a per-span capability of the UE; means for transmitting communications on the plurality of carriers in accordance with the distribution; means for determining an effective number of carriers for a given subcarrier spacing based at least in part on a total number of carriers of the plurality of carriers, a number of carriers of the given subcarrier spacing, and the threshold associated with the monitoring capability, wherein the threshold identifies a total number of carriers for which the UE supports per-span blind detection or CCE limitation; means for determining the distribution, with regard to a first carrier and a second carrier associated with the given subcarrier spacing, based at least in part on respective per-span capabilities of the first carrier and the second carrier and on the effective number of carriers; means for selecting respective slots of the plurality of carriers; means for determining, for a set of carriers, of the plurality of carriers, a set of values based at least in part on dividing respective maximum numbers of blind decodes or respective maximum numbers of non-overlapped CCEs across respective sets of spans of the respective slots of the set of carriers by respective maximum numbers of blind decodes or non-overlapped CCEs indicated by respective per-span capabilities for the respective sets of spans; means for determining the distribution so that a sum of the set of values does not exceed a total number of carriers for which the UE supports per-span blind detection or CCE limitation; and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some RATs, two sets of scheduling downlink control information (DCI) formats are supported: a fallback DCI (e.g., DCI formats 1-0 and 0-0 in 5G/NR) for downlink (DL) and/or uplink (UL) scheduling, and a non-fallback DCI (e.g., DCI formats 1-1 and 0-1 in 5G/NR) for DL/UL scheduling. In some deployments, such as an enhanced ultra-reliable low latency communication (eURLLC) supporting deployment, two additional DCI formats may be used: a DCI format 2-0 for UL scheduling and a DCI format 2-1 for DL scheduling. The two additional DCI formats may have flexible sizes, meaning that the bitwidth of many fields of the two additional DCI formats is configurable. Therefore, these two additional DCI formats can be configured with a small size to improve physical downlink control channel (PDCCH) reliability or with a larger size to improve scheduling flexibility and/or provide more functionality. The choice between these two approaches (e.g., small size or larger size) can be made by the scheduler.

In some RATs, such as 3GPP Release 15 of 5G/NR, different PDCCH monitoring capabilities are defined. As an example, a feature group (FG) 3-1 (which may be mandatory for Release 15 UEs to support) may indicate that the UE is capable of monitoring all PDCCH candidates for scheduling data that are within the first few symbols of a slot. As another example, an FG 3-5b (which may be optional for Release 15 UEs to support) may be defined based at least in part on a span concept. A span is a number of consecutive symbols in a slot where the UE is configured to monitor PDCCH. Each PDCCH monitoring occasion is within one span. A slot can include multiple spans, and a span can include one or more PDCCH candidates. Different span configurations may be supported. Span configurations are described in more detail in connection with FIG. 3.

In a 5G/NR network, a base station transmits a PDCCH (e.g., including control information, such as DCI) based at least in part on a search space set. A given search space set defines candidates that may carry a PDCCH within the search space set, where each candidate is associated with one or more CCEs. A CCE may be composed of multiple resource element groups (REGs). A REG may include one resource block and one OFDM symbol. One or more search space sets may be associated with a control resource set (CORESET). In a 5G/NR network, a base station may flexibly schedule and transmit the PDCCH. In other words, transmission of the PDCCH in the 5G/NR network is not limited to a particular set of frequency resources and/or time resources in a given radio frame, as in the case of, for example, a LTE network. PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set.

In order to receive a PDCCH associated with one or more candidates of a given UE-specific search space set (i.e., a search space set that may carry control information specific to one or more particular UEs), a UE may attempt to decode a PDCCH in candidates of the search space set. For example, the UE may determine one or more CCE indices associated with a candidate, and may attempt to decode the PDCCH (e.g., using a blind decoding procedure). In some cases (e.g., 3GPP Release 15 of 5G/NR), limits on the number of non-overlapping CCEs and BDs are defined on a per-slot basis. Thus, a large number of CCEs/BDs (in the extreme case, all of them) may be configured within one span. This significantly increases the UE complexity, particularly when attempting to conform to processing timelines that are suitable for supporting ultra-reliable low latency communication (URLLC) applications. On the other hand, if the scheduler chooses to distribute the CCEs/BDs across different spans, the number of CCE/BDs per span may not be sufficient. For example, for a subcarrier spacing (SCS) of 30 kilohertz (kHz) and a span capability of (X,Y)=(2,2), each span can have 8 CCEs. Hence, only one candidate of aggregation level=8 can be supported. Span capabilities are described in more detail in connection with FIG. 3.

To address the above issues, 3GPP Release 16 of 5G/NR introduces a PDCCH monitoring capability that is based at least in part on a span configuration of the UE. To improve scheduling flexibility, the number of non-overlapping CCEs and BDs per slot are increased as compared to 3GPP Release 15 of 5G/NR. Furthermore, to relax the UE complexity, a per-span CCE/BD limit (also referred to as a per-span capability) may be specified. This PDCCH monitoring capability may be referred to herein as a span-based monitoring capability or a Release 16 monitoring capability, whereas the PDCCH monitoring capability defined on a per-slot basis may be referred to as a slot-based monitoring capability or a Release 15 monitoring capability. In other words, slot-based monitoring is monitoring for which CCE/BD limits are defined per slot, whereas span-based monitoring is monitoring for which CCE/BD limits are defined per span.

A UE may report PDCCH monitoring capabilities for a set of cases. For example, the UE may report PDCCH monitoring capabilities for Case 1, Case 2, and Case 3. The PDCCH monitoring capability for Case 1 identifies a number of component carriers (CCs) for which the UE can perform slot-based monitoring. The PDCCH monitoring capability for Case 2 identifies a number of CCs for which the UE can perform span-based monitoring. The value of the threshold number of CCs for Case 2 can be smaller than 4. The PDCCH monitoring capability for Case 3 identifies the number of CCs for which the UE can perform slot-based monitoring and the number of CCs for which the UE can perform span-based monitoring on different cells. As used herein, slot-based monitoring may refer to a monitoring configuration in which CCE and BD limits are per slot (e.g., a Release 15 monitoring configuration). Each of the numbers of CCs (for slot-based monitoring and span-based monitoring) can be smaller than 4. The sum of the numbers of CCs for which the UE can perform span-based monitoring and slot-based monitoring may not be larger than 4 and may or may not be smaller than 4. In some cases, the UE may report the numbers of CCs for the which the UE can perform span-based monitoring and slot-based monitoring separately from each other.

In some cases, the UE may be configured with a number of carriers that exceeds the threshold identified by the PDCCH monitoring capability. For example, if the UE is configured with both Release 15 and Release 16 PDCCHs across different carriers, and if the number of DL carriers exceeds the UE's capability for monitoring Release 15 PDCCHs and/or Release 16 PDCCHs, the number of non-overlapped CCEs to be received or BDs to be performed may exceed the UE's capabilities on one or more carriers. Therefore, it may be beneficial to split the CCEs and/or BDs across carriers with different PDCCH monitoring capabilities (e.g., slot-based versus span-based), different SCSs, and different span patterns. However, there may be ambiguity as to how this distribution is to be performed, particularly in cases when the UE is configured with both Release 15 PDCCHs and Release 16 PDCCHs.

In some aspects, this distribution may be performed separately for a set of carriers associated with Release 16 PDCCHs (e.g., Release 16 carriers), and for a set of carriers associated with Release 15 PDCCHs (e.g., Release 15 carriers). In this case, the UE or the BS may determine the number of non-overlapping CCEs or BDs across the carriers and per scheduled cell for the carriers configured with the Release 15 PDCCH and the Release 16 PDCCH separately. For carriers configured with the Release 15 PDCCH, a value $N_{cells}^{cap}$ may represent the number of CCs for which the UE can perform slot-based monitoring, and the distribution of BDs (e.g., represented by Min the following equations) and non-overlapped CCEs (e.g., represented by C in the following equations) may be determined as follows:

If a UE is configured with $N_{cells}^{DL,\mu}$ downlink cells with DL bandwidth parts (BWPs) having SCS configuration $\mu$ where $\Sigma_{\mu=0}^{3} N_{cells}^{DL,\mu} \leq N_{cells}^{cap}$, the UE is not required to monitor, on the active DL BWP of the scheduling cell, more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell.

If a UE is configured with $N_{cells}^{DL,\mu}$ downlink cells with DL BWPs having SCS configuration $\mu$, where $\Sigma_{\mu=0}^{3} N_{cells}^{DL,\mu} > N_{cells}^{cap}$, a DL BWP of an activated cell is the active DL BWP of the activated cell, and a DL BWP of a deactivated cell is the DL BWP with index provided by firstActiveDownlinkBWP-Id for the deactivated cell, the UE is not required to monitor more than $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$ PDCCH candidates or more than $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$ non-overlapped CCEs per slot on the active DL BWP(s) of scheduling cell(s) from the $N_{cells}^{DL,\mu}$ downlink cells.

For each scheduled cell, the UE is not required to monitor on the active DL BWP with SCS configuration $\mu$ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

However, there may be ambiguity as to how CCEs and/or BDs should be distributed for Release 16 carriers, particularly for different span configurations and different SCSs. For example, the per-span CCE and BD limits or capabilities may impose additional challenges that are not present for the slot-based limits or capabilities of Release 15. Furthermore, different span configurations may be associated with different CCE limits and/or BD limits. Therefore, the Release 15 technique for distributing CCEs and/or BDs among a set of carriers may be inefficient or unsuitable for distributing CCEs and/or BDs on a set of carriers associated with Release 16 PDCCHs that exceed the UE's capabilities.

Some techniques and apparatuses described herein provide distribution of BDs and/or CCEs across a plurality of carriers associated with Release 16 PDCCHs when a number of the plurality of carriers exceeds a UE's capabilities. For example, some techniques and apparatuses described herein provide distribution of the BDs and/or CCEs based at least in part on respective SCSs and/or span configurations of the plurality of carriers. In this way, span-based limitation of CCEs and/or BDs may be enforced for carrier combinations associated with per-span monitoring or a combination of per-span and per-slot monitoring, which improves conformance with UE capabilities, improves scheduling flexibility, and reduces complexity.

Figure 3:
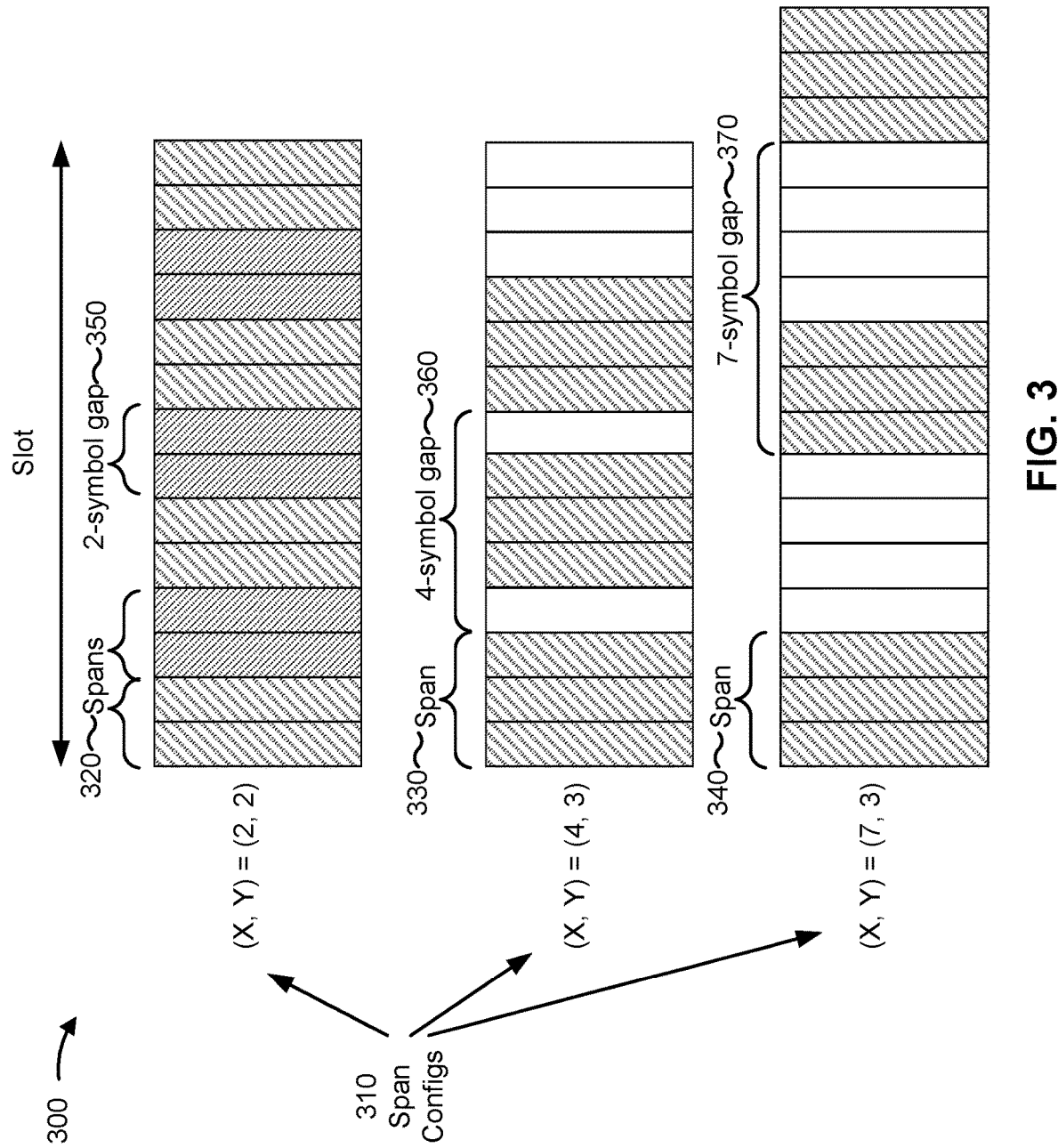
FIG. 3 is a diagram illustrating an example of spans in a slot for physical downlink control channel monitoring, in accordance with various aspects of the present disclosure.

FIG. 3 is a diagram illustrating an example of spans in a slot for physical downlink control channel monitoring, in accordance with various aspects of the present disclosure. FIG. 3 shows a set of slots that are associated with respective span configurations, shown by reference number 310. A span configuration may identify a minimum gap X between the starting symbol of two spans and a maximum span duration Y. If a UE monitors a PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.

The spans corresponding to span configurations (2, 2), (4, 3), and (7, 3) are shown by reference numbers 320, 330, and 340, respectively. The spans shown by reference number 320 are shown using alternating diagonal hatching, since these spans are adjacent to each other and would be difficult to differentiate otherwise. The spans shown by reference numbers 330 and 340 are separated by symbols that are not included in a span, which are shown by white rectangles.

The minimum gap X is shown for span configurations (2, 2), (4, 3), and (7, 3) by reference numbers 350, 360, and 370, respectively. It should be noted that X defines a minimum gap, so starting symbols of a pair of spans associated with span configuration (2, 2) may be two or more symbols apart from each other. Furthermore, the maximum span duration Y defines a maximum span duration, so the span 330 may have one-symbol or two-symbol spans while still being within the definition of the span configuration (4, 3).

A span configuration may be associated with a per-span capability for a number of BDs and/or a number of non-overlapped CCEs in a span. A per-span capability for a number of BDs may identify a maximum number of BDs that can be configured in a span shown by reference number 320/330/340, and a per-span capability for a number of non-overlapped CCEs may identify a maximum number of non-overlapped CCEs that can be configured in a span shown by reference number 320/330/340. These per-span capabilities may also be referred to as a BD limit and a CCE limit, respectively.

A UE may report a capability regarding one or more span configurations supported by the UE. For example, the UE may report that the UE supports one or more of span configurations (2, 2), (4, 3), and (7, 3). The UE may determine which span configuration is to be used for a communication based at least in part on a search space configuration. For example, a search space configuration may indicate search space candidates, and the UE may identify a span configuration that aligns with the search space candidates. In the case that the search space configuration aligns with two or more span configurations, the UE may use a largest CCE limit and/or a BD limit of the CCE limits and/or BD limits associated with the two or more span configurations.

As indicated above, FIG. 3 is provided as an example. Other examples may differ from what is described with respect to FIG. 3.

Figure 4:
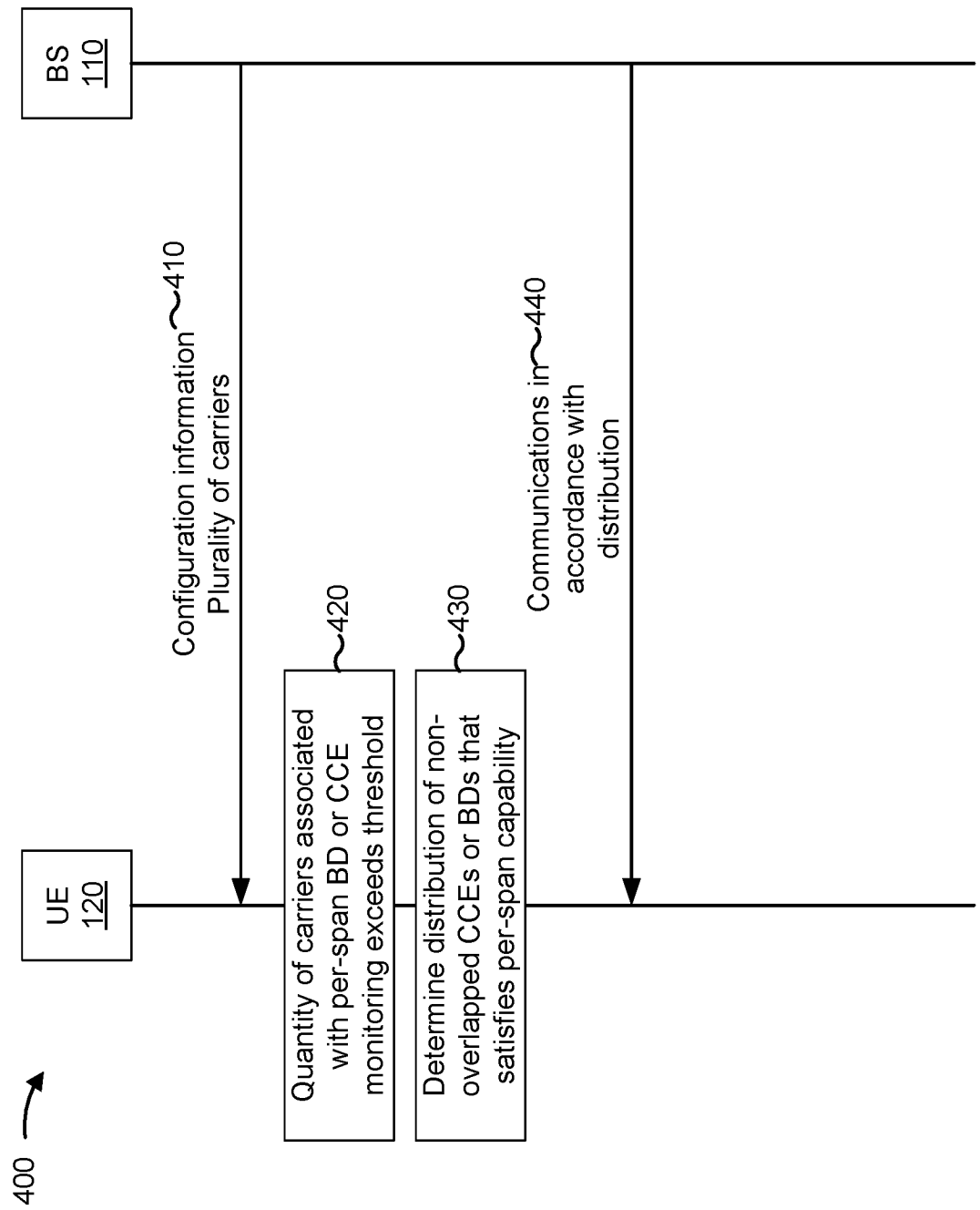
FIG. 4 is a diagram illustrating an example of distribution of blind decodes or non-overlapped control channel elements among a plurality of carriers for physical downlink control channel monitoring, in accordance with various aspects of the present disclosure.

FIG. 4 is a diagram illustrating an example 400 of distribution of blind decodes or non-overlapped control channel elements among a plurality of carriers for physical downlink control channel monitoring, in accordance with various aspects of the present disclosure. As shown, example 400 includes a UE 120 and a BS 110. The operations described in connection with example 400 and example 500 are largely described by reference to determining a distribution of BDs. However, these operations can readily be applied for determining a distribution of CCEs as well. For example, references to a variable M, which is commonly used herein to refer to a limit for a BD, may also be understood to refer to a variable C, which is commonly used herein to refer to a limit for a CCE.

As shown in FIG. 4, and by reference number 410, the UE 120 may be configured with a plurality of carriers. For example, the BS 110 may provide configuration information to the UE 120 for the plurality of carriers. In some aspects, the configuration information may indicate whether each carrier, of the plurality of carriers, is associated with a Release 15 (e.g., slot-based) PDCCH monitoring configuration (e.g., is a Release 15 carrier) or a Release 16 (e.g., span-based) PDCCH monitoring configuration (e.g., is a Release 16 carrier).

As shown by reference number 420, the UE 120 may determine that a number of carriers associated with per-span BD or CCE monitoring exceeds a threshold. For example, the plurality of carriers may include two or more carriers that are associated with PDCCHs configured for span-based monitoring (e.g., Release 16 PDCCHs). If a number of the two or more carriers exceeds a threshold associated with a monitoring capability for span-based monitoring of the plurality of carriers, then the UE 120 may determine that the number of carriers exceeds the threshold. In some aspects, the threshold may be referred to herein as $N_{cells}^{cap}$. In some aspects, the UE 120 may perform the operations described with regard to reference numbers 430 and 440 of FIG. 4 without determining that the number of carriers associated with per-span BD or CCE monitoring exceeds the threshold. For example, the UE 120 may optionally determine whether the number of carriers exceeds the threshold.

As shown by reference number 430, the UE 120 may determine a distribution of non-overlapped CCEs or BDs, across the plurality of carriers, that satisfies a per-span capability of the UE 120. For example, different carriers can be associated with different capabilities (e.g., for slot-based versus span-based monitoring), different SCSs, and/or different span configurations. The UE 120 may determine the distribution so that a per-slot monitoring capability of the UE 120 is satisfied while taking into account the different capabilities, SCSs, and/or span configurations. As shown by reference number 440, the UE 120 may receive communications on the plurality of carriers in accordance with the distribution. Examples of determining the distribution are provided below.

In some aspects, "hard splitting" is referred to herein. Hard splitting may refer to dividing a plurality of carriers into two or more groups of carriers based at least in part on one or more properties of the plurality of carriers. For example, if a set of carriers is hard-split based at least in part on SCS, then all carriers of the set of carriers associated with a first SCS may be placed in a first group, all carriers associated with a second SCS may be placed in a second group, and so on. As another example, a plurality of carriers may be hard-split into a group of Release 15 carriers and a group of Release 16 carriers. A group of carriers, formed by hard-splitting a plurality of carriers, may be associated with a set of BDs or CCEs that are to be distributed among the group of carriers. "Soft splitting" may be performed within a group that is formed by hard splitting a plurality of carriers. For example, a set of CCEs or BDs, of a group of carriers, may be soft-split among the group of carriers based at least in part on one or more rules, described below.

In some aspects, the UE 120 may distribute the non-overlapped CCEs and/or BDs based at least in part on SCSs and span configurations. As an example, the UE 120 may hard-split a plurality of carriers in accordance with SCSs and span configurations of the plurality of carriers to form groups of carriers with the same SCS and span configuration, and may soft-split non-overlapped CCEs and/or BDs of a group of carriers among the group of carriers. For example, let $N_{cells,DL}^{u,x,y}$ represent a group of carriers associated with a particular span configuration (x, y) and a SCS of u. Let $M_{PDCCH}^{span,u,x,y}$ represent the per-span limit on the number of BDs for a given span under the (x, y) configuration for a carrier with an SCS of u. In this case, $M_{PDCCH}^{total,span,u,x,y}$ gives the total number of BDs across one span in each of the carriers with SCS=u and the span configuration (x, y). Furthermore, on each scheduled carrier and for a given span, the UE 120 may distribute the BDs and/or non-overlapped CCEs based at least in part on a rule that the UE 120 is not expected to perform more than $\min\{M_{PDCCH}^{span,u,x,y}, M_{PDCCH}^{total,span,u,x,y}\}$ BDs. In some aspects, the distribution of the $M_{PDCCH}^{total,span,u,x,y}$ over the spans is performed by the BS 110 as long as the per-span limit given by the minimum conditional above is satisfied. The operations described above may be performed using the equations described elsewhere herein for determining the BD and/or CCE distribution for a Release 15 carrier. The UE 120 and/or the BS 110 may perform similar operations for the number of non-overlapped CCEs (e.g., using $C_{PDCCH}^{span,u,x,y}$ and $C_{PDCCH}^{total,span,u,x,y}$).

Consider a first example where the UE 120 is configured with 4 Release 16 carriers and is associated with a threshold number of 5 Release 16 carriers. In this example, 2 carriers, CC1 and CC2, have a span configuration of (2, 2) and an SCS of 30 kHz, and 2 carriers, CC3 and CC4, have a span configuration of (4, 3) and an SCS of 30 kHz. Furthermore, the UE 120 has a per-span capability for the (2, 2) span capability of total, w and for the (4, 3) span capability of z. In this case, $M_{PDCCH}^{total,span,30,(2,2)} = \lfloor 5 \cdot w \cdot 2/4 \rfloor = 2.5$ w BDs across one span of CC1 and one span of CC2 in total. Furthermore, on each span, the UE 120 may distribute no more than $\min\{w, 2.5\ w\} = w$ BDs. Furthermore, $M_{PDCCH}^{total,span,30,(4,3)} = \text{floor}\{5 * z * 2/5\} = 2.5$ z BDs across one span of CC3 and one span of CC4 in total. On each cell, the UE 120 may distribute no more than $\min\{z, 2.5\ z\} = z$ BDs. Now consider a second example where the UE 120 is configured with 4 Release 16 carriers and is associated with a threshold number of 3 Release 16 carriers (so that the capability of the UE 120 is exceeded). In this case, $M_{PDCCH}^{total,span,30,(2,2)} = \lfloor 3 \cdot w \cdot 2/4 \rfloor = 1.5$ w BDs across one span of CC1 and one sp CC2 in total, and on each span, the UE 120 may distribute no more than $\min\{w, 1.5\ w\} = w$ BDs. Furthermore, $M_{PDCCH}^{total,span,30,(4,3)} = \lfloor 3 \cdot z \cdot 2/4 \rfloor = 1.5$ z BDs across one span of CC3 and one span of CC4 in total, and on each span, the UE 120 may distribute no more than $\min\{z, 1.5\ z\} = z$ BDs.

In some aspects, if the UE supports multiple span configurations, and if the span pattern is valid for multiple supported span configurations, the UE 120 may select the span configuration with the largest CCE/BD limit per span. In this case, the hard-splitting of the plurality of carriers based at least in part on the span configuration may take the selection of the span configuration with the largest CCE/BD limit per span into account, or may be performed based at least in part on the selection of the span configuration with the largest CCE/BD limit per span.

In some aspects, the UE 120 may determine M based at least in part on respective spans of a first carrier and a second carrier. For example, the number M may be an upper bound on the BD limit for a span, and conformance with M may be determined by reference to the number of BDs in a first span on a first carrier and a second span on a second carrier. In a first aspect, referred to as Definition 1, the first span and the second span may be arbitrary spans on the first carrier and the second carrier. For example, Definition 1 may indicate that the number of BDs for any combination of spans on the first carrier and the second carrier is not to exceed the BD limit for a span. In a second aspect, referred to as Definition 2, the first span may be an arbitrary span on the first carrier and the second span may be a span on the second carrier that at least partially overlaps the first carrier in time. For example, Definition 2 may indicate that the number of BDs for any combination of a span on the first carrier and a span on the second carrier that overlaps the span on the first carrier is not to exceed the BD limit for a span. In a third aspect, referred to as Definition 3, the first span may be an arbitrary span on the first carrier and the second span may be a span on the second carrier that starts with a same symbol (e.g., a same OFDM symbol) as the span on the first carrier. For example, Definition 3 may indicate that the number of BDs for any combination of a span on the first carrier and a span on the second carrier that starts with a same OFDM symbol as the span on the first carrier is not to exceed the BD limit for a span.

Figure 5:
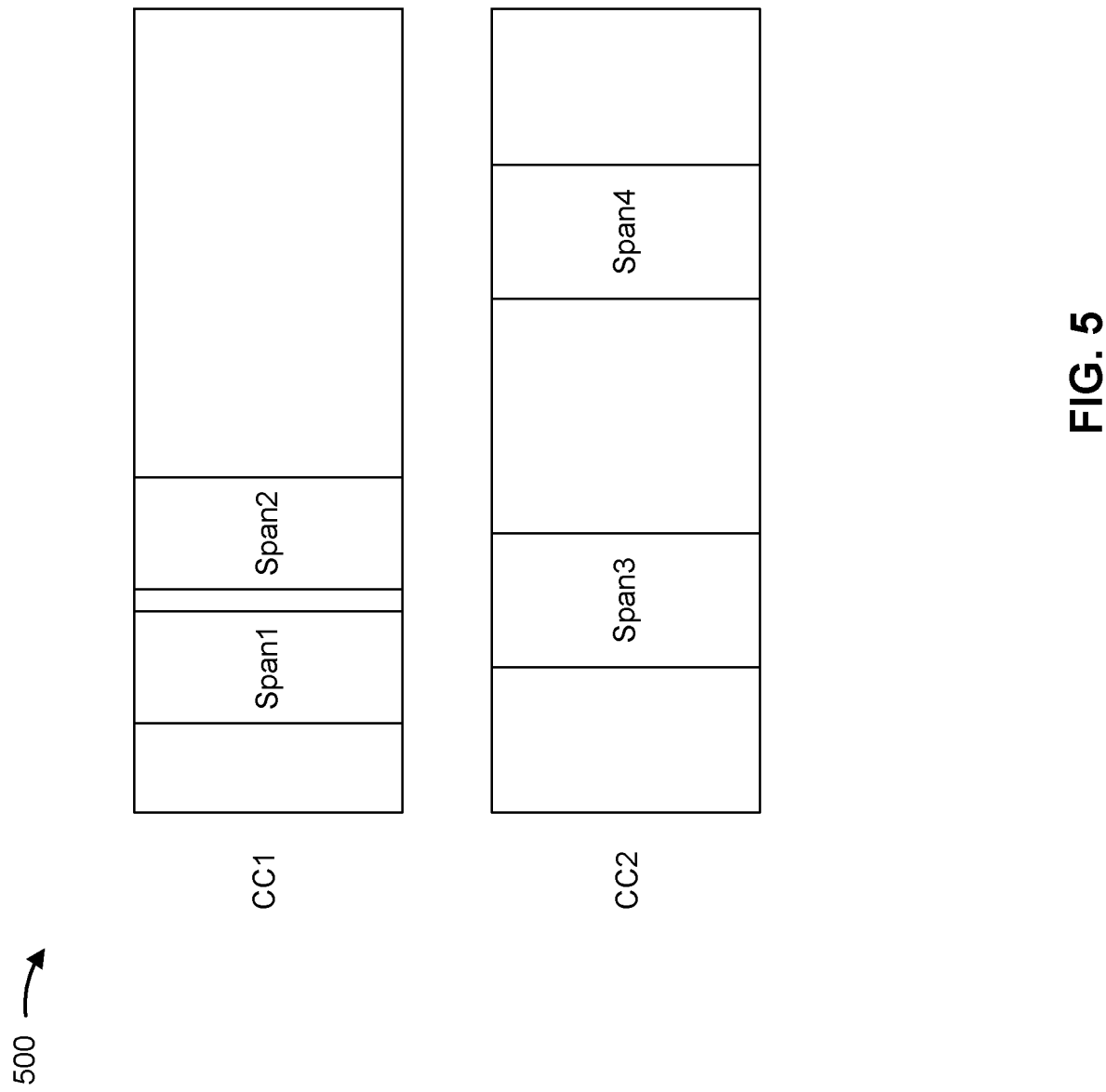
FIG. 5 is a diagram illustrating an example of spans on a pair of carriers for physical downlink control channel monitoring, in accordance with various aspects of the present disclosure.

FIG. 5 is a diagram illustrating an example 500 of spans on a pair of carriers for physical downlink control channel monitoring, in accordance with various aspects of the present disclosure. FIG. 5 provides an illustration used below to describe Definition 1 and Definition 2. As shown, example 500 includes a CC1 and a CC2. CC1 includes Span1 and Span2, and CC2 includes Span3 and Span4. As shown, Span3 partially overlaps Span1 and Span2 in time, though Span3 does not start with the same OFDM symbol as Span1 or Span 2. Under Definition 1 (described in connection with reference number 430 above), $M_{PDCCH}^{total,span,u,x,y}$ may be satisfied over any combination of a span from CC1 (e.g., Span1 or Span2) and a span from CC2 (e.g., Span3 or Span4). In particular, the number of BDs in Span i of CC1+Span j of CC2 should not be more than $M_{PDCCH}^{total,span,u,x,y}$. In addition, the number of BDs in no span should be more than the per-span capability defined for the considered span configuration. In some aspects, Definition 1 may apply for fully aligned spans (such as spans associated with a same starting symbol and length).

Under Definition 2, since span1 of CC1 overlaps with Span3 of CC2 and Span2 of CC1 also overlaps with Span3 of CC2, then the maximum total number of total, s, blind decodes or non-overlapped CCEs for Span1 and Span3$<=M_{PDCCH}^{total,span,u,x,y}$, and the maximum total number of blind decodes or non-overlapped CCEs for Span2 and Span3$<=M_{PDCCH}^{total,span,u,x,y}$. Furthermore, Mg (e.g., the maximum total number of blind decodes) for each of the 4 spans may be less than the per-span limit for the corresponding span configuration. In some aspects, Definition 2 may apply for spans that are not fully aligned (such as spans associated with different starting symbols or lengths).

Returning to FIG. 4, In some aspects, the UE 120 may distribute the non-overlapped CCEs and/or BDs based at least in part on SCSs, span configurations, and numbers of spans per slot. As an example, the UE 120 may hard-split a plurality of carriers in accordance with SCSs, span configurations, and numbers of spans per slot of the plurality of carriers to form groups of carriers with the same SCS, span configuration, and number of spans per slot. The UE 120 may soft-split non-overlapped CCEs and/or BDs of a group of carriers among the group of carriers. In this case, let $N_{cells,DL}^{u,x,y,n}$ represent the number of the carriers that satisfy a span configuration (x, y) with n spans per slot and configured with SCS=u. Let $M_{PDCCH}^{span,u,x,y}$ represent the limit on the number of BDs summed over the number of spans in a given carrier under the (x, y) span configuration for a carrier with SCS=u. $M_{PDCCH}^{total,u,x,y,n}$ may provide the total number of BDs across the carriers with SCS=u, an (x, y) span configuration, and n spans per slot.

As an example, consider a UE 120 for which an $N_{cell}^{cap}$ for the Release 16 PDCCH is 2 and which is configured with 6 carriers. For this example, the per-span limit on the number of BDs for a (2, 2) span configuration is 16, for a (4, 3) span configuration is 36, and for a (7,3) span configuration is 56. The 6 carriers include CC1, CC2, CC3, CC4, CC5, and CC6. CC1 and CC2 have a SCS of 30 kHz, a (2,2) span configuration, and 7 spans per slot, meaning that the total BD limit in a slot for CC1 and CC2 is 7*16=112. CC3 has an SCS of 15 kHz, a (2,2) span configuration, and 2 spans per slot, meaning that the total BD limit in a slot for CC3 is 2*16=32. CC4 and CC5 have a SCS of 30 kHz, a (4,3) span configuration, and 3 spans per slot, meaning that the total BD limit in a slot for CC4 and CC5 is 3*36=108.

CC6 has a SCS of 15 kHz, a (7,3) span configuration, and one span per slot, meaning that the total BD limit in a slot for CC6 is 1*56=56.

Based on the above values, $M_{PDCCH}^{total,30,2,2,7}$=floor(⅔*7*16*2)=74 BDs across all spans of CC1 and CC2. In this case, the per-span limit of 16 BDs may still be respected. $M_{PDCCH}^{total,15,2,2,2}$=floor(⅔*2*16*1)=10 BDs across all spans of CC3. In this case, the per-span limit of 16 BDs may still be respected. Similar operations may be performed for CC4, CC5, and CC6.

In some aspects, the UE 120 may distribute the non-overlapped CCEs and/or BDs based at least in part on SCSs and span configurations. As an example, the UE 120 may hard-split a plurality of carriers in accordance with SCSs of the plurality of carriers to form groups of carriers with the same SCS using the equation $N_{cell}^{cap}*N_{cell}^{DL,u}/\Sigma_j N_{cells}^{DL,j}$. The UE 120 may soft-split non-overlapped CCEs and/or BDs of a group of carriers among the group of carriers based at least in part on span configurations. In this case, for each carrier, the UE 120 may divide the maximum number of BDs across different spans by the per-span BD limit of the associated span configuration. Then, the UE 120 may sum such values across carriers with a given SCS. The UE 120 may distribute the BDs and/or CCEs so that the sum is smaller than or equal to the value derived from dividing the maximum number of BDs by the per-span BD limit of the associated span configuration.

As an example, consider a UE 120 with $N_{cell}^{cap}$=2. In this example, four carriers are configured with a Release 16 PDCCH:

CC1 with SCS=30 kHz, span configuration (2,2), and per-span BD limit of 16

CC2 with SCS=30 kHz, span configuration (4,3), and per-span BD limit of 36

CC3 with SCS=15 kHz, span configuration (2,2), and per-span BD limit of 16

CC4 with SCS=15 kHz, span configuration (7,3), and per-span BD limit of 56.

For the SCS of 30 kHz, the UE 120 may determine an effective number of carriers of 2*⅔=1. For the SCS of 15 kHz, the UE 120 may determine an effective number of carriers of 2*⅔=1. The UE 120 may then distribute the BDs of the carriers with SCS of 30 kHz, and the BDs of the carriers with SCS of 15 kHz, as shown below:

Max (number of BDs across spans of CC1)/16+Max (number of BDs across spans of CC2)/36<=1

Max (number of BDs across spans of CC3)/16+Max (number of BDs across spans of CC4)/56<=1

For each carrier, the per-span limit should be satisfied in accordance with the corresponding span configuration.

In some aspects, the UE 120 may perform soft splitting across carriers configured with a Release 16 PDCCH with the same or different SCS and/or span configuration. For example, the UE 120 may select a slot of a carrier, of a plurality of carriers, with the smallest SCS value. For other carriers of the plurality of carriers, the UE 120 may select all slots that overlap in time with the slot of the carrier with the smallest SCS value. The UE 120 may take the maximum number of BDs across different spans of the slots within the slot defined by the smallest SCS, and may divide the maximum number of BDs by the per-span BD limit of a span configuration associated with that span, to determine a set of values corresponding to the plurality of carriers. The UE 120 may distribute the BDs so that a sum of the set of values is smaller than or equal to the value indicated by pddch-BlindDetectionCA-r16.

As an example, consider a UE with a threshold for span-based monitoring (e.g., $N_{cell}^{cap}$) of 2. In this example, four carriers are configured with a Release 16 PDCCH:

CC1 with an SCS of 30 kHz, a span configuration of (2, 2), and a per-span BD limit of 16
CC2 with an SCS of 30 kHz, a span configuration of (4, 3), and per-span BD limit of 36
CC3 with an SCS=15 kHz, a span configuration of (2, 2), and per-span BD limit of 16
CC4 with an SCS=15 kHz, a span configuration of (7, 3), and per-span BD limit of 56.

In the above slot configuration, the UE 120 may select a single slot of CC3 and CC4 and may select two slots of CC1 and CC2 that overlap the single slot of CC3 and CC4. For CC1, the UE 120 may take the maximum number of BDs across the spans in the two slots and may divide by the per-span BD limit of 16. For CC2, the UE 120 may take the maximum number of BDs across the spans in the two slots and may divide by the per-span BD limit of 36. For CC3, the UE 120 may take the maximum number of BDs across the spans in the slot and may divide by the per-span BD limit of 16. For CC3, the UE 120 may take the maximum number of BDs across the spans in the slot and may divide by the per-span BD limit of 56. The UE 120 may distribute the BDs so that the sum of the values determined above does not exceed the NZ value of 2, and so that the per-span capabilities of the UE 120 are satisfied for each span according to the SCS and span configuration of the corresponding carrier.

As indicated above, FIGS. 4 and 5 are provided as one or more examples. Other examples may differ from what is described with respect to FIGS. 4 and 5.

Figure 6:
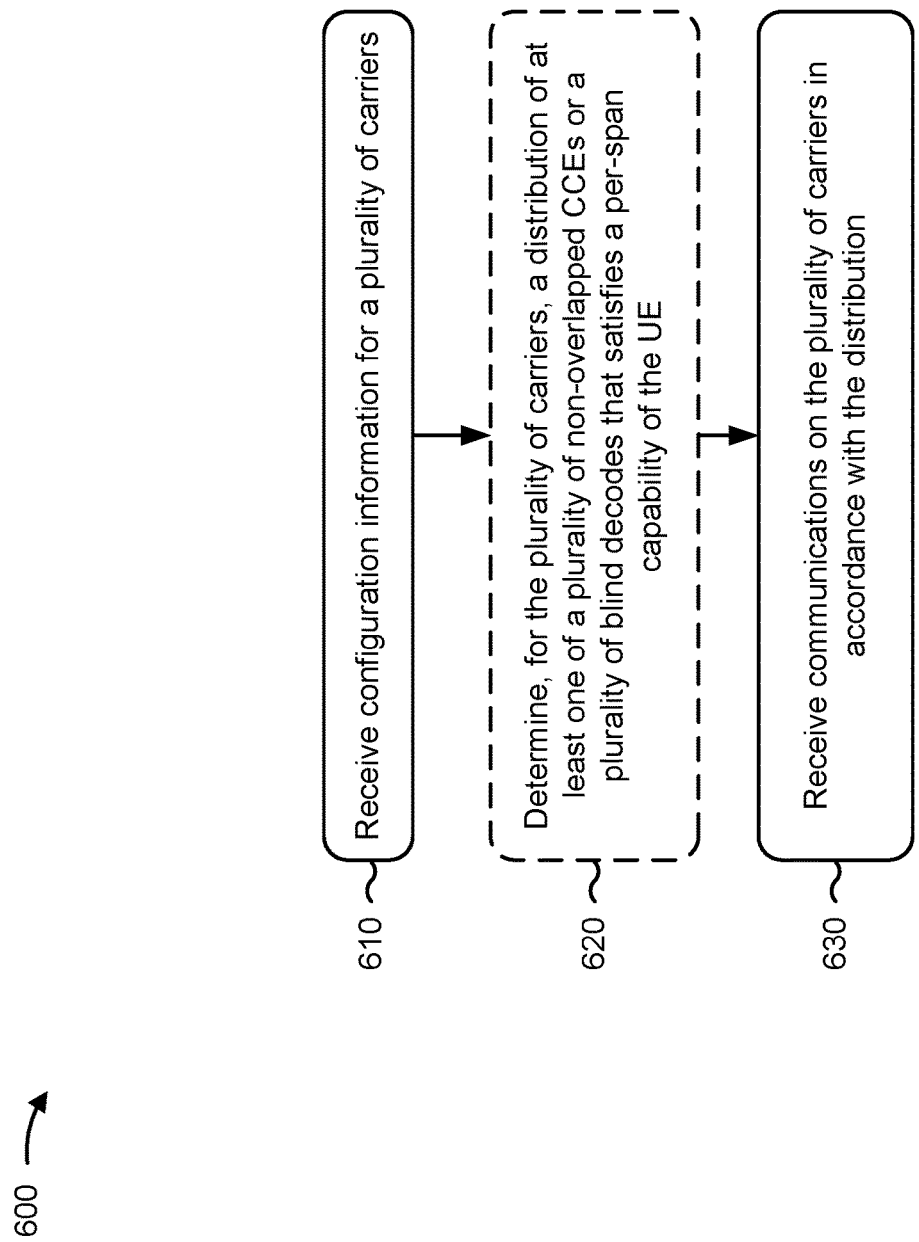
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with CCE and BD limits for a PDCCH.

As shown in FIG. 6, in some aspects, process 600 may include receiving configuration information for a plurality of carriers (block 610). For example, the UE (e.g., using antenna 252, DEMOD 254, MIMO detector 256, receive processor 258, controller/processor 280, and/or the like) may receive configuration information for a plurality of carriers, as described above. In some aspects, a number of carriers, of the plurality of carriers, exceeds a threshold associated with a monitoring capability of the UE. In some aspects, the monitoring capability is for span-based monitoring of the plurality of carriers. In some aspects, a distribution of at least one of a plurality of non-overlapped control channel elements (CCEs) or a plurality of blind decodes satisfies a per-span capability of the UE. For example, the distribution may be among a plurality of sets of carriers, and each set of carriers of the plurality of set of carriers is associated with a respective subcarrier spacing and a respective span configuration.

As further shown in FIG. 6, in some aspects, process 600 may include determining, for the plurality of carriers, a distribution of at least one of a plurality of non-overlapped CCEs or a plurality of blind decodes that satisfies a per-span capability of the UE (block 620). For example, the UE (e.g., using controller/processor 280 and/or the like) may optionally (as indicated by the dashed border of block 620) determine, for the plurality of carriers based at least in part on the number of carriers exceeding the threshold, a distribution of at least one of a plurality of non-overlapped CCEs or a plurality of blind decodes that satisfies a per-span capability of the UE, as described above.

As further shown in FIG. 6, in some aspects, process 600 may include receiving communications on the plurality of carriers in accordance with the distribution (block 630). For example, the UE (e.g., using antenna 252, DEMOD 254, MIMO detector 256, receive processor 258, controller/processor 280, and/or the like) may receive communications on the plurality of carriers in accordance with the distribution, as described above.

Process 600 may include additional aspects, such as any single aspect or any combination of aspects described below and/or in connection with one or more other processes described elsewhere herein.

In a first aspect, the per-span capability is a first per-span capability and is specific to a first span configuration, a first set of carriers of the plurality of carriers is associated with the first span configuration, and a second set of carriers of the plurality of carriers is associated with a second per-span capability specific to a second span configuration.

In a second aspect, alone or in combination with the first aspect, the distribution is based at least in part on the first per-span capability and the second per-span capability.

In a third aspect, alone or in combination with one or more of the first and second aspects, the distribution is based at least in part on a rule indicating that, for a given span associated with a given subcarrier spacing and a given span configuration, the UE is not to receive a number of non-overlapped CCEs or perform a number of blind decodes that exceeds a minimum of a maximum number of blind decodes or non-overlapped CCEs indicated by the per-span capability for the given span, and a maximum total number of blind decodes or non-overlapped CCEs across respective spans of the plurality of carriers.

In a fourth aspect, alone or in combination with one or more of the first through third aspects, the respective spans comprise a combination of a first span on a first carrier, of the plurality of carriers, and a second span on a second carrier of the plurality of carriers.

In a fifth aspect, alone or in combination with one or more of the first through fourth aspects, the respective spans comprise a first span on a first carrier, of the plurality of carriers, and a second span on a second carrier, of the plurality of carriers, the second span at least partially overlaps the first span.

In a sixth aspect, alone or in combination with one or more of the first through fifth aspects, the second span starts with a same modulation symbol as the first span.

In a seventh aspect, alone or in combination with one or more of the first through sixth aspects, when the UE supports multiple span configurations for the given span a search space or control resource set configuration is aligned with the multiple span configurations, the given span configuration is a span configuration, of the multiple span configurations, associated with a largest number of non-overlapped CCEs or blind decodes per span.

In an eighth aspect, alone or in combination with one or more of the first through seventh aspects, the distribution is based at least in part on a rule indicating that, for a given span associated with a given subcarrier spacing, a given span configuration, and a given number of spans per slot, the UE is not to receive a number of non-overlapped CCEs or perform a number of blind decodes that exceeds a minimum of a maximum number of blind decodes or non-overlapped CCEs indicated by the per-span capability for the given span, and a maximum total number of blind decodes or non-overlapped CCEs across respective spans of the plurality of carriers.

In a ninth aspect, alone or in combination with one or more of the first through eighth aspects, determining the distribution further comprises determining an effective number of carriers for a given subcarrier spacing based at least in part on a total number of carriers of the plurality of carriers, a number of carriers of the given subcarrier spacing, and the threshold associated with the monitoring capability, wherein the threshold identifies a total number of carriers for which the UE supports per-span blind detection or CCE limitation; and determining the distribution, with regard to a first carrier and a second carrier associated with the given subcarrier spacing, based at least in part on respective per-span capabilities of the first carrier and the second carrier and on the effective number of carriers.

In a tenth aspect, alone or in combination with one or more of the first through ninth aspects, the respective per-span capabilities of the first carrier and the second carrier are based at least in part on respective span configurations of the first carrier and the second carrier.

In an eleventh aspect, alone or in combination with one or more of the first through tenth aspects, determining the distribution further comprises selecting respective slots of the plurality of carriers; determining, for a set of carriers, of the plurality of carriers, a set of values based at least in part on dividing respective maximum numbers of blind decodes or respective maximum numbers of non-overlapped CCEs across respective sets of spans of the respective slots of the set of carriers by respective maximum numbers of blind decodes or non-overlapped CCEs indicated by respective per-span capabilities for the respective sets of spans; and determining the distribution so that a sum of the set of values does not exceed threshold associated with the monitoring capability of the UE.

In a twelfth aspect, alone or in combination with one or more of the first through eleventh aspects, the distribution is based at least in part on a rule that the per-span capability is not to be exceeded for each span of the respective sets of spans.

In a thirteenth aspect, alone or in combination with one or more of the first through twelfth aspects, a number of carriers, of the plurality of carriers, exceeds a threshold associated with a monitoring capability of the UE, wherein the monitoring capability is for span-based monitoring of the plurality of carriers, and wherein determining the distribution is based at least in part on the number of carriers exceeding the threshold In a fourteenth aspect, alone or in combination with one or more of the first through thirteenth aspects, the configuration relates to a larger plurality of carriers including the plurality of carriers, wherein the larger plurality of carriers includes one or more carriers associated with a slot-based monitoring configuration, wherein the plurality of carriers are associated with a span-based monitoring configuration, and wherein the distribution is based at least in part on a hard split between the plurality of carriers and the one or more carriers.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
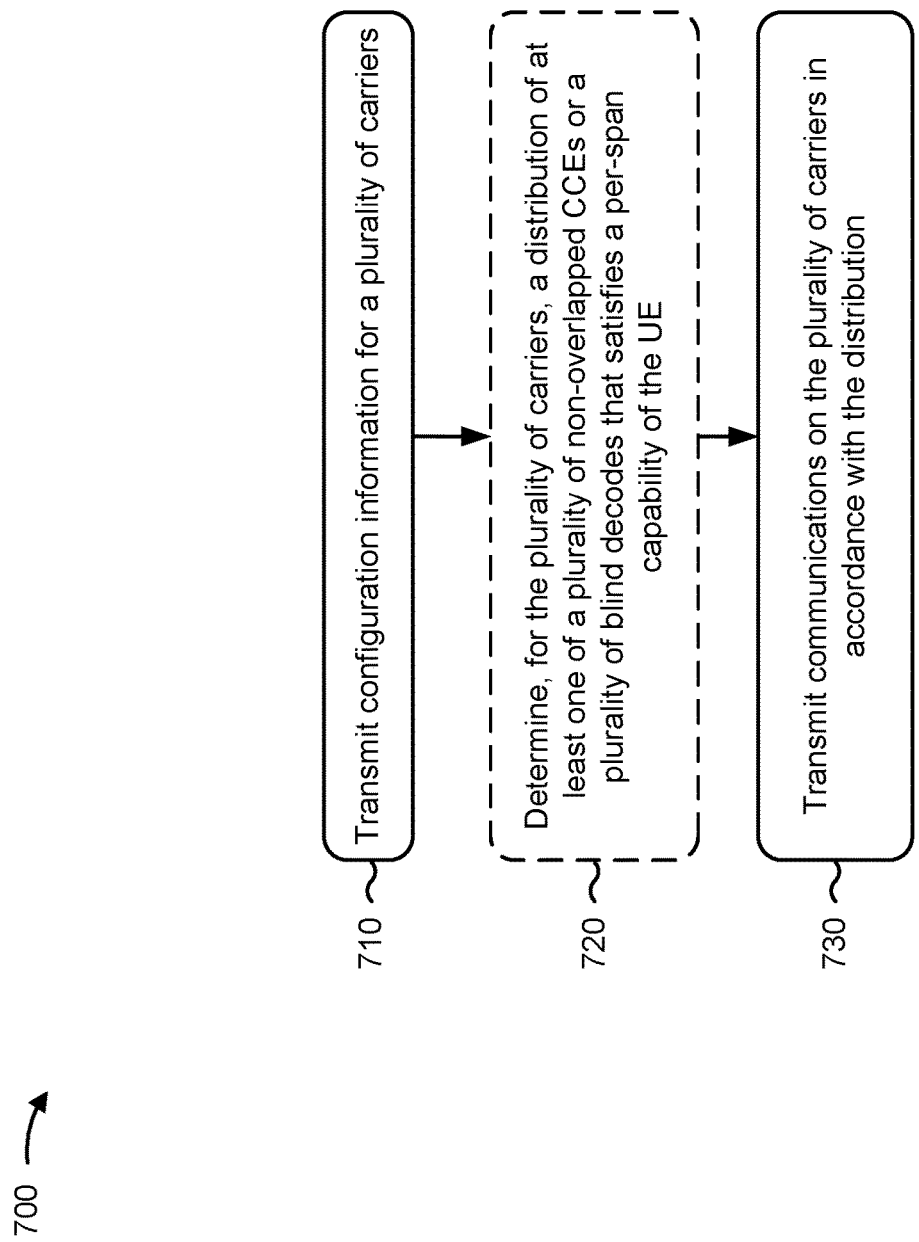
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where the base station (e.g., BS 110 and/or the like) performs operations associated with CCE and BD limits for a PDCCH.

As shown in FIG. 7, in some aspects, process 700 may include transmitting configuration information for a plurality of carriers (block 710). For example, the base station (e.g., using controller/processor 240, transmit processor 220, TX MIMO processor 230, MOD 232, antenna 234, and/or the like) may transmit configuration information for a plurality of carriers, as described above. In some aspects, a number of carriers, of the plurality of carriers, exceeds a threshold associated with a monitoring capability of a UE. In some aspects, the monitoring capability is for span-based monitoring of the plurality of carriers. In some aspects, a distribution of at least one of a plurality of non-overlapped control channel elements (CCEs) or a plurality of blind decodes satisfies a per-span capability of the UE. For example, the distribution may be among a plurality of sets of carriers, and each set of carriers of the plurality of set of carriers is associated with a respective subcarrier spacing and a respective span configuration.

As further shown in FIG. 7, in some aspects, process 700 may optionally (as indicated by the dashed border of block 720) include determining, for the plurality of carriers, a distribution of at least one of a plurality of non-overlapped CCEs or a plurality of blind decodes that satisfies a per-span capability of a UE (block 720). For example, the base station (e.g., using antenna 234, DEMOD 232, MIMO detector 236, receive processor 238, controller/processor 240, and/or the like) may determine, for the plurality of carriers, a distribution of at least one of a plurality of non-overlapped CCEs or a plurality of blind decodes that satisfies a per-span capability of a UE, as described above.

As further shown in FIG. 7, in some aspects, process 700 may include transmitting communications on the plurality of carriers in accordance with the distribution (block 730). For example, the base station (e.g., using controller/processor 240, transmit processor 220, TX MIMO processor 230, MOD 232, antenna 234, and/or the like) may transmit communications on the plurality of carriers in accordance with the distribution, as described above.

Process 700 may include additional aspects, such as any single aspect or any combination of aspects described below and/or in connection with one or more other processes described elsewhere herein.

In a first aspect, a number of carriers, of the plurality of carriers, exceeds a threshold associated with a monitoring capability of the UE, the monitoring capability is for span-based monitoring of the plurality of carriers, and determining the distribution is based at least in part on the number of carriers exceeding the threshold.

In a second aspect, alone or in combination with the first aspect, the per-span capability is a first per-span capability and is specific to a first span configuration, a first set of carriers of the plurality of carriers is associated with the first span configuration, and a second set of carriers of the plurality of carriers is associated with a second per-span capability specific to a second span configuration.

In a third aspect, alone or in combination with one or more of the first and second aspects, the distribution is based at least in part on the first per-span capability and the second per-span capability.

In a fourth aspect, alone or in combination with one or more of the first through third aspects, the distribution is based at least in part on a rule indicating that, for a given span associated with a given subcarrier spacing and a given span configuration, the UE is not to receive a number of non-overlapped CCEs or perform a number of blind decodes that exceeds a minimum of: a maximum number of blind decodes or non-overlapped CCEs indicated by the per-span capability for the given span, and a maximum total number of blind decodes or non-overlapped CCEs across respective spans of the plurality of carriers.

In a fifth aspect, alone or in combination with one or more of the first through fourth aspects, the respective spans comprise a combination of a first span on a first carrier, of the plurality of carriers, and a second span on a second carrier of the plurality of carriers.

In a sixth aspect, alone or in combination with one or more of the first through fifth aspects, the respective spans comprise a first span on a first carrier, of the plurality of carriers, and a second span on a second carrier, of the plurality of carriers, the second span at least partially overlaps the first span.

In a seventh aspect, alone or in combination with one or more of the first through sixth aspects, the second span starts with a same symbol as the first span.

In an eighth aspect, alone or in combination with one or more of the first through seventh aspects, when the UE supports multiple span configurations for the given span and a search space or control resource set configuration is aligned with the multiple span configurations, the given span configuration is a span configuration, of the multiple span configurations, associated with a largest number of non-overlapped CCEs or blind decodes per span.

In a ninth aspect, alone or in combination with one or more of the first through eighth aspects, the distribution is based at least in part on a rule indicating that, for a given span associated with a given subcarrier spacing, a given span configuration, and a given number of spans per slot, the UE is not to receive a number of non-overlapped CCEs or perform a number of blind decodes that exceeds a minimum of: a maximum number of blind decodes or non-overlapped CCEs indicated by the per-span capability for the given span, and a maximum total number of blind decodes or non-overlapped CCEs across respective spans of the plurality of carriers.

In a tenth aspect, alone or in combination with one or more of the first through ninth aspects, determining the distribution further comprises: determining an effective number of carriers for a given subcarrier spacing based at least in part on a total number of carriers of the plurality of carriers, a number of carriers of the given subcarrier spacing, and a threshold associated with a monitoring capability for span-based monitoring of the plurality of carriers, wherein the threshold identifies a total number of carriers for which the UE supports per-span blind detection or CCE limitation; and determining the distribution, with regard to a first carrier and a second carrier associated with the given subcarrier spacing, based at least in part on respective per-span capabilities of the first carrier and the second carrier and on the effective number of carriers.

In an eleventh aspect, alone or in combination with one or more of the first through tenth aspects, the respective per-span capabilities of the first carrier and the second carrier are based at least in part on respective span configurations of the first carrier and the second carrier.

In a twelfth aspect, alone or in combination with one or more of the first through eleventh aspects, determining the distribution further comprises selecting respective slots of the plurality of carriers; determining, for a set of carriers, of the plurality of carriers, a set of values based at least in part on dividing respective maximum numbers of blind decodes or respective maximum numbers of non-overlapped CCEs across respective sets of spans of the respective slots of the set of carriers by respective maximum numbers of blind decodes or non-overlapped CCEs indicated by respective per-span capabilities for the respective sets of spans; and determining the distribution so that a sum of the set of values does not exceed threshold associated with the monitoring capability of the UE.

In a thirteenth aspect, alone or in combination with one or more of the first through twelfth aspects, the distribution is based at least in part on a rule that the per-span capability is not to be exceeded for each span of the respective sets of spans.

In a fourteenth aspect, alone or in combination with one or more of the first through thirteenth aspects, the configuration relates to a larger plurality of carriers including the plurality of carriers, wherein the larger plurality of carriers includes one or more carriers associated with a slot-based monitoring configuration, wherein the plurality of carriers are associated with a span-based monitoring configuration, and wherein the distribution is based at least in part on a hard split between the plurality of carriers and the one or more carriers.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some aspects of the present disclosure:

Aspect 1: A method of wireless communication performed by a user equipment (UE), comprising: receiving configuration information for a plurality of carriers, wherein a number of carriers, of the plurality of carriers, exceeds a threshold associated with a monitoring capability of the UE, wherein the monitoring capability is for span-based monitoring of the plurality of carriers, wherein a distribution of at least one of a plurality of non-overlapped control channel elements (CCEs) or a plurality of blind decodes satisfies a per-span capability of the UE, wherein the distribution is among a plurality of sets of carriers, and wherein each set of carriers of the plurality of sets of carriers is associated with a respective subcarrier spacing and a respective span configuration; and receiving communications on the plurality of carriers in accordance with the distribution.

Aspect 2: The method of aspect 1, wherein a number of carriers, of the plurality of carriers, exceeds a threshold associated with a monitoring capability of the UE, wherein the monitoring capability is for span-based monitoring of the plurality of carriers, and wherein determining the distribution is based at least in part on the number of carriers exceeding the threshold.

Aspect 3: The method of any of aspects 1-2, wherein the per-span capability is a first per-span capability and is specific to a first span configuration, wherein a first set of carriers of the plurality of sets of carriers is associated with the first span configuration, and wherein a second set of carriers of the plurality of sets of carriers is associated with a second per-span capability specific to a second span configuration.

Aspect 4: The method of aspect 3, wherein the distribution is based at least in part on the first per-span capability and the second per-span capability.

Aspect 5: The method of any of aspects 1-4, wherein the distribution is based at least in part on a rule indicating that, for a given span associated with a given subcarrier spacing and a given span configuration, the UE is not to receive a number of non-overlapped CCEs or perform a number of blind decodes that exceeds a minimum of: a maximum number of blind decodes or non-overlapped CCEs indicated by the per-span capability for the given span, and a maximum total number of blind decodes or non-overlapped CCEs across respective spans of the plurality of carriers.

Aspect 6: The method of aspect 5, wherein the respective spans comprise a combination of a first span on a first carrier, of the plurality of carriers, and a second span on a second carrier of the plurality of carriers.

Aspect 7: The method of aspect 5, wherein the respective spans comprise a first span on a first carrier, of the plurality of carriers, and a second span on a second carrier, of the plurality of carriers, wherein the second span at least partially overlaps the first span.

Aspect 8: The method of aspect 7, wherein the second span starts with a same symbol as the first span.

Aspect 9: The method of aspect 5, wherein, when the UE supports multiple span configurations for the given span and a search space or control resource set configuration is aligned with the multiple span configurations, the given span configuration is a span configuration, of the multiple span configurations, associated with a largest number of non-overlapped CCEs or blind decodes per span.

Aspect 10: The method of any of aspects 1-9, wherein the distribution is based at least in part on a rule indicating that, for a given span associated with a given subcarrier spacing, a given span configuration, and a given number of spans per slot, the UE is not to receive a number of non-overlapped CCEs or perform a number of blind decodes that exceeds a minimum of: a maximum number of blind decodes or non-overlapped CCEs indicated by the per-span capability for the given span, and a maximum total number of blind decodes or non-overlapped CCEs across respective spans of the plurality of carriers.

Aspect 11: The method of any of aspect 1-10, wherein determining the distribution further comprises: determining an effective number of carriers for a given subcarrier spacing based at least in part on a total number of carriers of the plurality of carriers, a number of carriers of the given subcarrier spacing, and a threshold associated with a monitoring capability for span-based monitoring of the plurality of carriers, wherein the threshold identifies a total number of carriers for which the UE supports per-span blind detection or CCE limitation; and determining the distribution, with regard to a first carrier and a second carrier associated with the given subcarrier spacing, based at least in part on respective per-span capabilities of the first carrier and the second carrier and on the effective number of carriers.

Aspect 12: The method of aspect 11, wherein the respective per-span capabilities of the first carrier and the second carrier are based at least in part on respective span configurations of the first carrier and the second carrier.

Aspect 13: The method of any of aspects 1-12, wherein determining the distribution further comprises: selecting respective slots of the plurality of carriers; determining, for a set of carriers, of the plurality of carriers, a set of values based at least in part on dividing respective maximum numbers of blind decodes or respective maximum numbers of non-overlapped CCEs across respective sets of spans of the respective slots of the set of carriers by respective maximum numbers of blind decodes or non-overlapped CCEs indicated by respective per-span capabilities for the respective sets of spans; and determining the distribution so that a sum of the set of values does not exceed threshold associated with the monitoring capability of the UE.

Aspect 14: The method of aspect 13, wherein the distribution is based at least in part on a rule that the per-span capability is not to be exceeded for each span of the respective sets of spans.

Aspect 15: A method of wireless communication performed by a base station, comprising: transmitting configuration information for a plurality of carriers, wherein a number of carriers, of the plurality of carriers, exceeds a threshold associated with a monitoring capability of a user equipment (UE), wherein the monitoring capability is for span-based monitoring of the plurality of carriers, wherein, for the plurality of carriers, a distribution of at least one of a plurality of non-overlapped control channel elements (CCEs) or a plurality of blind decodes satisfies a per-span capability of the UE, wherein the distribution is among a plurality of sets of carriers, and wherein each set of carriers of the plurality of set of carriers is associated with a respective subcarrier spacing and a respective span configuration; and transmitting communications on the plurality of carriers in accordance with the distribution.

Aspect 16: The method of aspect 15, wherein a number of carriers, of the plurality of carriers, exceeds a threshold associated with a monitoring capability of the UE, wherein the monitoring capability is for span-based monitoring of the plurality of carriers, and wherein determining the distribution is based at least in part on the number of carriers exceeding the threshold.

Aspect 17: The method of any of aspects 15-16, wherein the per-span capability is a first per-span capability and is specific to a first span configuration, wherein a first group of carriers of the plurality of carriers is associated with the first span configuration, and wherein a second group of carriers of the plurality of carriers is associated with a second per-span capability specific to a second span configuration.

Aspect 18: The method of aspect 17, wherein the distribution is based at least in part on the first per-span capability and the second per-span capability.

Aspect 19: The method of any of aspects 15-18, wherein the distribution is based at least in part on a rule indicating that, for a given span associated with a given subcarrier spacing and a given span configuration, the UE is not to receive a number of non-overlapped CCEs or perform a number of blind decodes that exceeds a minimum of: a maximum number of blind decodes or non-overlapped CCEs indicated by the per-span capability for the given span, and a maximum total number of blind decodes or non-overlapped CCEs across respective spans of the plurality of carriers.

Aspect 20: The method of aspect 19, wherein the respective spans comprise a combination of a first span on a first carrier, of the plurality of carriers, and a second span on a second carrier of the plurality of carriers.

Aspect 21: The method of aspect 19, wherein the respective spans comprise a first span on a first carrier, of the plurality of carriers, and a second span on a second carrier, of the plurality of carriers, wherein the second span at least partially overlaps the first span.

Aspect 22: The method of aspect 19, wherein the second span starts with a same symbol as the first span.

Aspect 23: The method of aspect 17, wherein, when the UE supports multiple span configurations for the given span and a search space or control resource set configuration is aligned with the multiple span configurations, the given span configuration is a span configuration, of the multiple span configurations, associated with a largest number of non-overlapped CCEs or blind decodes per span.

Aspect 24: An apparatus for wireless communication at a device, comprising a processor; memory coupled with the processor; and instructions stored in the memory and executable by the processor to cause the apparatus to perform the method of one or more aspects of aspects 1-23.

Aspect 25: A device for wireless communication, comprising a memory and one or more processors coupled to the memory, the memory and the one or more processors configured to perform the method of one or more aspects of aspects 1-23.

Aspect 26: An apparatus for wireless communication, comprising at least one means for performing the method of one or more aspects of aspects 1-23.

Aspect 27: A non-transitory computer-readable medium storing code for wireless communication, the code comprising instructions executable by a processor to perform the method of one or more aspects of aspects 1-23.

Aspect 28: A non-transitory computer-readable medium storing a set of instructions for wireless communication, the set of instructions comprising one or more instructions that, when executed by one or more processors of a device, cause the device to perform the method of one or more aspects of aspects 1-23.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
at least one memory; and
one or more processors coupled to the at least one memory, the one or more processors configured, individually or in any combination, to:
receive configuration information for a plurality of carriers, wherein a number of carriers associated with span-based monitoring, of the plurality of carriers, exceeds a threshold associated with a span-based monitoring capability of the UE, wherein a distribution of at least one of a plurality of non-overlapped control channel elements (CCEs) or a plurality of blind decodes satisfies a per-span capability of the UE, wherein the distribution is among a plurality of sets of carriers, and wherein each set of carriers of the plurality of sets of carriers is associated with a respective subcarrier spacing and a respective span configuration; and
receive communications via the plurality of carriers in accordance with the distribution.

2. The UE of claim 1, wherein determining the distribution is based at least in part on the number of carriers exceeding the threshold.

3. The UE of claim 1, wherein the per-span capability is a first per-span capability and is specific to a first span configuration, wherein a first set of carriers of the plurality of sets of carriers is associated with the first span configuration, and wherein a second set of carriers of the plurality of sets of carriers is associated with a second per-span capability specific to a second span configuration.

4. The UE of claim 3, wherein the distribution is based at least in part on the first span configuration and the second span configuration.

5. The UE of claim 1, wherein the distribution is based at least in part on a rule indicating that, for a given span associated with a given subcarrier spacing and a given span configuration, the UE is not to receive a number of non-overlapped CCEs or perform a number of blind decodes that exceeds a minimum of:
a maximum number of blind decodes or non-overlapped CCEs indicated by the per-span capability for the given span, and
a maximum total number of blind decodes or non-overlapped CCEs across respective spans of the plurality of carriers.

6. The UE of claim 5, wherein the respective spans comprise a combination of a first span on a first carrier, of the plurality of carriers, and a second span on a second carrier of the plurality of carriers.

7. The UE of claim 5, wherein the respective spans comprise a first span on a first carrier, of the plurality of carriers, and a second span on a second carrier, of the plurality of carriers, wherein the second span at least partially overlaps the first span.

8. The UE of claim 7, wherein the second span starts with a same symbol as the first span.

9. The UE of claim 5, wherein, when the UE supports multiple span configurations and a search space or control resource set configuration is aligned with the multiple span configurations, the given span configuration is a span configuration, of the multiple span configurations, associated with a largest number of non-overlapped CCEs or blind decodes per span.

10. The UE of claim 1, wherein the distribution is based at least in part on a rule indicating that, for a given span associated with a given subcarrier spacing, a given span configuration, and a given number of spans per slot, the UE is not to receive a number of non-overlapped CCEs or perform a number of blind decodes that exceeds a minimum of:
   a maximum number of blind decodes or non-overlapped CCEs indicated by the per-span capability for the given span, and
   a maximum total number of blind decodes or non-overlapped CCEs across respective spans of the plurality of carriers.

11. The UE of claim 1, wherein the one or more processors, when determining the distribution, are configured to:
   determine an effective number of carriers for a given subcarrier spacing based at least in part on a total number of carriers of the plurality of carriers, a number of carriers of the given subcarrier spacing, and the threshold, wherein the threshold identifies a total number of carriers for which the UE supports per-span blind detection or CCE limitation; and
   determine the distribution, with regard to a first carrier and a second carrier associated with the given subcarrier spacing, based at least in part on respective per-span capabilities of the first carrier and the second carrier and on the effective number of carriers.

12. The UE of claim 11, wherein the respective per-span capabilities of the first carrier and the second carrier are based at least in part on respective span configurations of the first carrier and the second carrier.

13. The UE of claim 1, wherein the one or more processors, when determining the distribution, are configured to:
   select respective slots of the plurality of carriers;
   determine, for a set of carriers, of the plurality of carriers, a set of values based at least in part on dividing respective maximum numbers of blind decodes or respective maximum numbers of non-overlapped CCEs across respective sets of spans of the respective slots of the set of carriers by respective maximum numbers of blind decodes or non-overlapped CCEs indicated by respective per-span capabilities for the respective sets of spans; and
   determine the distribution so that a sum of the set of values does not exceed the threshold.

14. The UE of claim 13, wherein the distribution is based at least in part on a rule that the per-span capability is not to be exceeded for each span of the respective sets of spans.

15. The UE of claim 1, wherein the configuration information relates to a larger plurality of carriers including the plurality of carriers, wherein the larger plurality of carriers includes one or more carriers associated with a slot-based monitoring configuration, wherein the plurality of carriers are associated with a span-based monitoring configuration, and wherein the distribution is based at least in part on a hard split between the plurality of carriers and the one or more carriers.

16. A network entity for wireless communication, comprising:
   at least one memory; and
   one or more processors coupled to the at least one memory, the one or more processors configured, individually or in any combination, to:
      transmit configuration information for a plurality of carriers, wherein a number of carriers associated with span-based monitoring, of the plurality of carriers, exceeds a threshold associated with a span-based monitoring capability of a user equipment (UE), wherein, for the plurality of carriers, a distribution of at least one of a plurality of non-overlapped control channel elements (CCEs) or a plurality of blind decodes satisfies a per-span capability of the UE, wherein the distribution is among a plurality of sets of carriers, and wherein each set of carriers of the plurality of sets of carriers is associated with a respective subcarrier spacing and a respective span configuration; and
      transmit communications via the plurality of carriers in accordance with the distribution.

17. The network entity of claim 16, wherein determining the distribution is based at least in part on the number of carriers exceeding the threshold.

18. The network entity of claim 16, wherein the per-span capability is a first per-span capability and is specific to a first span configuration, wherein a first group of carriers of the plurality of carriers is associated with the first span configuration, and wherein a second group of carriers of the plurality of carriers is associated with a second per-span capability specific to a second span configuration.

19. The network entity of claim 18, wherein the distribution is based at least in part on the first per-span capability and the second per-span capability.

20. The network entity of claim 16, wherein the distribution is based at least in part on a rule indicating that, for a given span associated with a given subcarrier spacing and a given span configuration, the UE is not to receive a number of non-overlapped CCEs or perform a number of blind decodes that exceeds a minimum of:
   a maximum number of blind decodes or non-overlapped CCEs indicated by the per-span capability for the given span, and
   a maximum total number of blind decodes or non-overlapped CCEs across respective spans of the plurality of carriers.

21. The network entity of claim 20, wherein the respective spans comprise a combination of a first span on a first carrier, of the plurality of carriers, and a second span on a second carrier of the plurality of carriers.

22. The network entity of claim 20, wherein the respective spans comprise a first span on a first carrier, of the plurality of carriers, and a second span on a second carrier, of the plurality of carriers, wherein the second span at least partially overlaps the first span.

23. The network entity of claim 22, wherein the second span starts with a same symbol as the first span.

24. The network entity of claim 20, wherein, when the UE supports multiple span configurations for the given span and a search space or control resource set configuration is aligned with the multiple span configurations, the given span configuration is a span configuration, of the multiple span configurations, associated with a largest number of non-overlapped CCEs or blind decodes per span.

25. A method of wireless communication performed by a user equipment (UE), comprising:
receiving configuration information for a plurality of carriers, wherein a number of carriers associated with span-based monitoring, of the plurality of carriers, exceeds a threshold associated with a span-based monitoring capability of the UE, wherein a distribution of at least one of a plurality of non-overlapped control channel elements (CCEs) or a plurality of blind decodes satisfies a per-span capability of the UE, wherein the distribution is among a plurality of sets of carriers, and wherein each set of carriers of the plurality of sets of carriers is associated with a respective subcarrier spacing and a respective span configuration; and
receiving communications via the plurality of carriers in accordance with the distribution.

26. The method of claim 25,
wherein determining the distribution is based at least in part on the number of carriers exceeding the threshold.

27. The method of claim 25, wherein the per-span capability is a first per-span capability and is specific to a first span configuration, wherein a first set of carriers of the plurality of sets of carriers is associated with the first span configuration, and
wherein a second set of carriers of the plurality of sets of carriers is associated with a second per-span capability specific to a second span configuration.

28. The method of claim 27, wherein the distribution is based at least in part on the first per-span capability and the second per-span capability.

29. The method of claim 25, wherein the distribution is based at least in part on a rule indicating that, for a given span associated with a given subcarrier spacing and a given span configuration, the UE is not to receive a number of non-overlapped CCEs or perform a number of blind decodes that exceeds a minimum of:
a maximum number of blind decodes or non-overlapped CCEs indicated by the per-span capability for the given span, and
a maximum total number of blind decodes or non-overlapped CCEs across respective spans of the plurality of carriers.

30. The method of claim 29, wherein the respective spans comprise a combination of a first span on a first carrier, of the plurality of carriers, and a second span on a second carrier of the plurality of carriers.

31. The method of claim 29, wherein the respective spans comprise a first span on a first carrier, of the plurality of carriers, and a second span on a second carrier, of the plurality of carriers, wherein the second span at least partially overlaps the first span.

32. The method of claim 31, wherein the second span starts with a same symbol as the first span.

33. The method of claim 29, wherein, when the UE supports multiple span configurations for the given span and a search space or control resource set configuration is aligned with the multiple span configurations, the given span configuration is a span configuration, of the multiple span configurations, associated with a largest number of non-overlapped CCEs or blind decodes per span.

34. The method of claim 25, wherein the distribution is based at least in part on a rule indicating that, for a given span associated with a given subcarrier spacing, a given span configuration, and a given number of spans per slot, the UE is not to receive a number of non-overlapped CCEs or perform a number of blind decodes that exceeds a minimum of:
a maximum number of blind decodes or non-overlapped CCEs indicated by the per-span capability for the given span, and
a maximum total number of blind decodes or non-overlapped CCEs across respective spans of the plurality of carriers.

35. The method of claim 25, wherein determining the distribution further comprises:
determining an effective number of carriers for a given subcarrier spacing based at least in part on a total number of carriers of the plurality of carriers, a number of carriers of the given subcarrier spacing, and the threshold, wherein the threshold identifies a total number of carriers for which the UE supports per-span blind detection or CCE limitation; and
determining the distribution, with regard to a first carrier and a second carrier associated with the given subcarrier spacing, based at least in part on respective per-span capabilities of the first carrier and the second carrier and on the effective number of carriers.

36. The method of claim 35, wherein the respective per-span capabilities of the first carrier and the second carrier are based at least in part on respective span configurations of the first carrier and the second carrier.

37. The method of claim 25, wherein determining the distribution further comprises:
selecting respective slots of the plurality of carriers;
determining, for a set of carriers, of the plurality of carriers, a set of values based at least in part on dividing respective maximum numbers of blind decodes or respective maximum numbers of non-overlapped CCEs across respective sets of spans of the respective slots of the set of carriers by respective maximum numbers of blind decodes or non-overlapped CCEs indicated by respective per-span capabilities for the respective sets of spans; and
determining the distribution so that a sum of the set of values does not exceed the threshold.

38. The method of claim 37, wherein the distribution is based at least in part on a rule that the per-span capability is not to be exceeded for each span of the respective sets of spans.

39. A method of wireless communication performed by a network entity, comprising:
transmitting configuration information for a plurality of carriers, wherein a number of carriers associated with span-based monitoring, of the plurality of carriers, exceeds a threshold associated with a span-based monitoring capability of a user equipment (UE), wherein, for the plurality of carriers, a distribution of at least one of a plurality of non-overlapped control channel elements (CCEs) or a plurality of blind decodes satisfies a per-span capability of the UE, wherein the distribution is among a plurality of sets of carriers, and wherein each set of carriers of the plurality of sets of carriers is associated with a respective subcarrier spacing and a respective span configuration; and
transmitting communications via the plurality of carriers in accordance with the distribution.

40. The method of claim 39,
wherein determining the distribution is based at least in part on the number of carriers exceeding the threshold.

41. The method of claim 39, wherein the per-span capability is a first per-span capability and is specific to a first span configuration, wherein a first group of carriers of the plurality of carriers is associated with the first span configuration, and wherein a second group of carriers of the plurality of carriers is associated with a second per-span capability specific to a second span configuration.

42. The method of claim 41, wherein the distribution is based at least in part on the first per-span capability and the second per-span capability.

43. The method of claim 39, wherein the distribution is based at least in part on a rule indicating that, for a given span associated with a given subcarrier spacing and a given span configuration, the UE is not to receive a number of non-overlapped CCEs or perform a number of blind decodes that exceeds a minimum of:
  a maximum number of blind decodes or non-overlapped CCEs indicated by the per-span capability for the given span, and
  a maximum total number of blind decodes or non-overlapped CCEs across respective spans of the plurality of carriers.

44. The method of claim 43, wherein the respective spans comprise a combination of a first span on a first carrier, of the plurality of carriers, and a second span on a second carrier of the plurality of carriers.

45. The method of claim 43, wherein the respective spans comprise a first span on a first carrier, of the plurality of carriers, and a second span on a second carrier, of the plurality of carriers, wherein the second span at least partially overlaps the first span.

46. The method of claim 45, wherein the second span starts with a same symbol as the first span.

47. The method of claim 43, wherein, when the UE supports multiple span configurations for the given span and a search space or control resource set configuration is aligned with the multiple span configurations, the given span configuration is a span configuration, of the multiple span configurations, associated with a largest number of non-overlapped CCEs or blind decodes per span.

* * * * *